United States Patent Office.

SMITH GARDNER, OF NEW YORK, N. Y., ASSIGNOR TO THE INTERNATIONAL MARBLE-COLORING COMPANY, OF NEW YORK.

*Letters Patent No. 99,306, dated February 1, 1870.*

---

IMPROVEMENT IN COLORING MARBLE.

---

The Schedule referred to in these Letters Patent and making part of the same.

---

*To all whom it may concern:*

Be it known that I, SMITH GARDNER, of New York, in the county of New York, and State of New York, have invented certain new and useful Improvements in the Process of Coloring Marble; and I do hereby declare that the following is a full, clear, and exact description thereof.

The nature of my invention consists in coloring marbles, granites, alabasters, and any and all earthy or mineral substances through the entire mass, by certain processes and agents that will be hereinafter fully set forth.

By chemical combinations and ingredients, containing the various elements of coloring-matter, in proper proportions, and properly prepared, I am enabled, through molecular attraction and infiltration, to effect a general or specific absorption of the coloring-matter of any substances containing it, whether it be from the vegetable, animal, or mineral kingdom, or two or all three of them combined, whereby I impart to white, or whitish, veined, clouded, or other kinds of marbles, of all qualities, in a crude or worked, plain or polished state, in the block or slab, of every size, shape, or form, whatever color, shade, or tint I may desire, and this coloring penetrates, pervades, and remains permanently unchanged in and through the entire mass thus treated.

By the same or similar processes or agents, I also treat granite, alabaster, rock-crystal, sandstone, freestone, ivories, bones, and all stones or rocks, or any or all earths, or earthy or mineral substances, whether in a natural or artificial shape or condition, imparting to them such colors, shades, or tints as I desire.

In order to enable others skilled in the art to which my invention appertains, to make and use the same, I will now proceed to describe the manner in which the same is or may be accomplished.

The materials for coloring, I draw from any substances containing them, whether of vegetable, animal, or mineral origin, especially the aniline or coal-tar, so called, colors, of which, separately, or their combinations with each other, or with every variety of other colors, I make extensive use.

In the preparation of the colors, my object being to make as perfect a solution as possible, I use all necessary agents, the principal being water, alcohol, creosote, acids, particularly gallic acid, alkalies, heat, and electricity, separately, mixed, or combined, according to the nature of the coloring-matter, or the material to be colored, the variations of the processes extending over too wide a field for minute specification.

I will, however, here give the recipes for a few of the most common colors.

For plain standard sienna, I use a solution of bichromate of potash, in water, at 200° Fahrenheit; one ounce bichromate of potash to seven ounces water.

For antique sienna, same as above, with addition of one scruple of the powder of aniline, "orange," or "coralline," dissolved in alcohol, 75° proof.

For rose or pink, a solution in water of one ounce cochineal, four drachms cream tartar, eight drachms carbonate of potash, and eight drachms pulverized alum. Boil cochineal (ground) and carbonate of potash three minutes, and, while boiling, add the two other ingredients, and stir. This recipe is for two quarts of liquid, when done.

For garnet, same as above, adding one scruple of aniline-powder, dissolved in alcohol, 75° proof.

The substances to be colored must be exposed to an artificial heat (I prefer an oven or heated air-chamber,) sufficient to expel the water or moisture contained in them, and to open the interstices to enable the substances the more readily to receive the coloring liquid. This heat is not so great as to disintegrate, dissolve, or weaken the texture, crystallization, or cohesion of the particles composing the substance, formation, or structure to be colored, as would be the case, for instance, in all the marbles or mineral substances containing carbonates, silicates, &c., where too high a temperature liberates carbon, or other ingredients, and weakens or impairs the strength and compactness of the material.

When thus prepared, the substance to be colored is exposed to a bath of the coloring-matter. It may be submerged in the bath, or partially, by touching the coloring-matter on one of the flat sides, or the side may rest on sponge, or felt, or any other porous substance saturated with the coloring-matter, for whenever the substance to be colored touches the solution, the process of coloring begins through molecular attraction and infiltration, and under these conditions the work goes on until the entire mass, whatever it may be, is colored through.

I am fully aware of Asa Gill's patent, of November 27, 1866, and disclaim his method of coloring marble.

Having thus fully described my invention,

What I claim as new, and desire to secure by Letters Patent, is—

Coloring marble, or other substances, through the entire mass, by infiltration and molecular attraction, as herein described.

In testimony that I claim the foregoing as my own, I affix my signature, in presence of two witnesses.

SMITH GARDNER.

Witnesses:
NATHANIEL GILL,
C. EDWARD L. LESLIE.